(No Model.) 3 Sheets—Sheet 1.
J. H. SAUER.
POTATO DIGGER.

No. 472,552. Patented Apr. 12, 1892.

Witnesses.
A. Ruppert.
H. A. Daniels.

Inventor.
John H. Sauer
Per
Thomas P. Simpson
Atty (No Model.) 3 Sheets—Sheet 2.

J. H. SAUER.
POTATO DIGGER.

No. 472,552. Patented Apr. 12, 1892.

Witnesses.
A. Ruppert.
H. A. Daniels

Inventor.
John H. Sauer,
Per
Thomas P. Simpson
Atty (No Model.)　　　　　　　　　　　　3 Sheets—Sheet 3.
J. H. SAUER.
POTATO DIGGER.

No. 472,552.　　　　　　　　Patented Apr. 12, 1892.

Witnesses.
A. Ruppert,
G. B. Towles

Inventor.
J. H. Sauer,
Per
Thomas P. Simpson,
Atty

UNITED STATES PATENT OFFICE.

JOHN H. SAUER, OF STACY, MINNESOTA.

POTATO-DIGGER.

SPECIFICATION forming part of Letters Patent No. 472,552, dated April 12, 1892.

Application filed June 22, 1891. Serial No. 397,120. (No model.)

*To all whom it may concern:*

Be it known that I, JOHN H. SAUER, a citizen of the United States, residing at Stacy, in the county of Chisago and State of Minnesota, have invented certain new and useful Improvements in Potato-Diggers; and I do hereby declare the following to be a full, clear, and exact description of the invention, such as will enable others skilled in the art to which it appertains to make and use the same.

The special object of the invention is to make a machine which will lift potatoes out of the ground, loosen and separate the halm therefrom, sift away the dirt, and drop them clean upon the surface of the ground, where all will be plainly seen.

Figure 1:
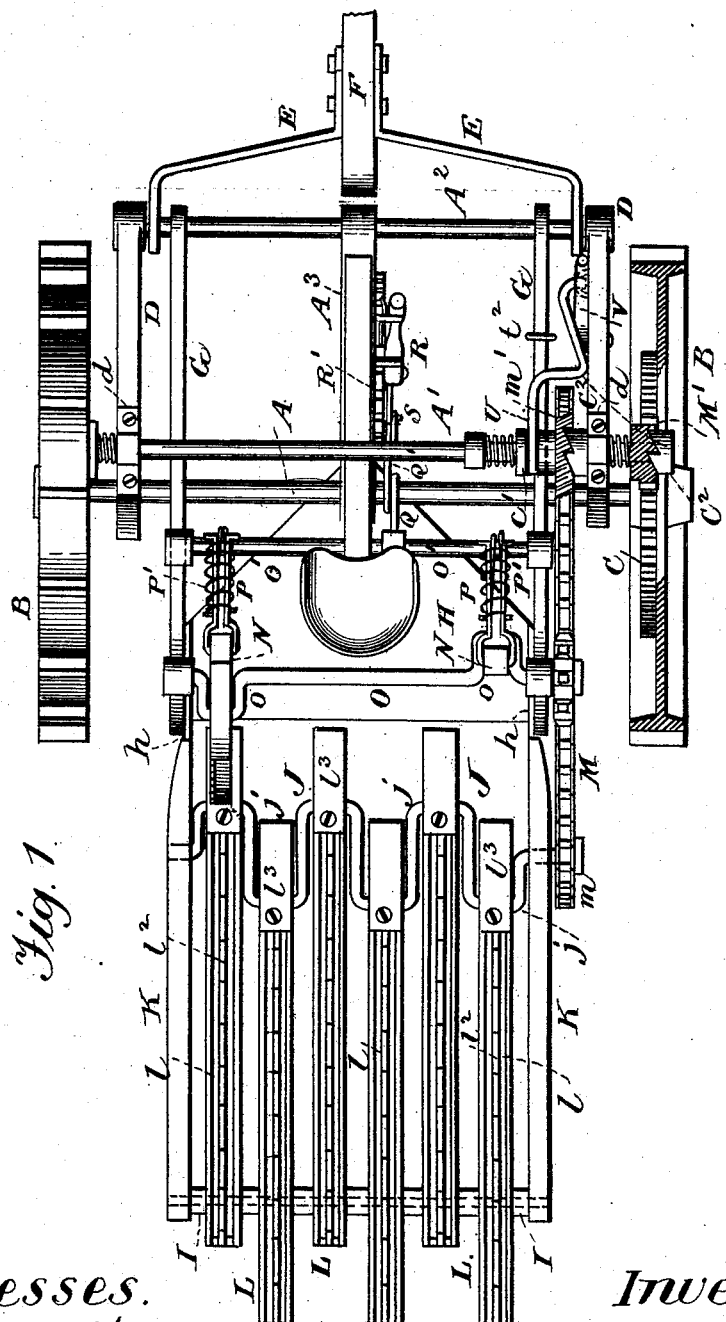
Figure 2:
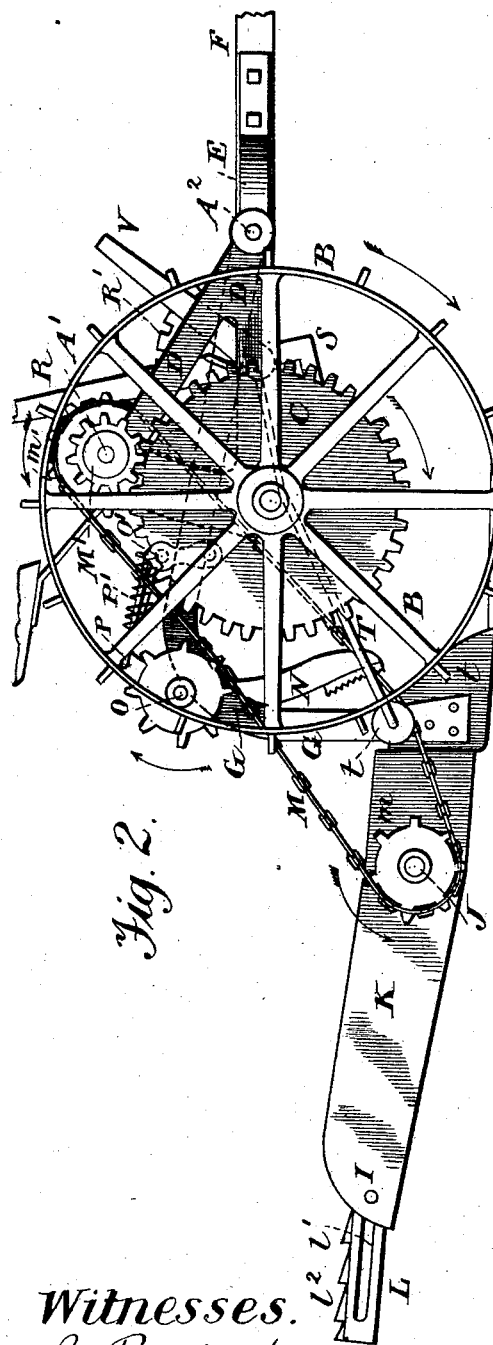
Figure 3:
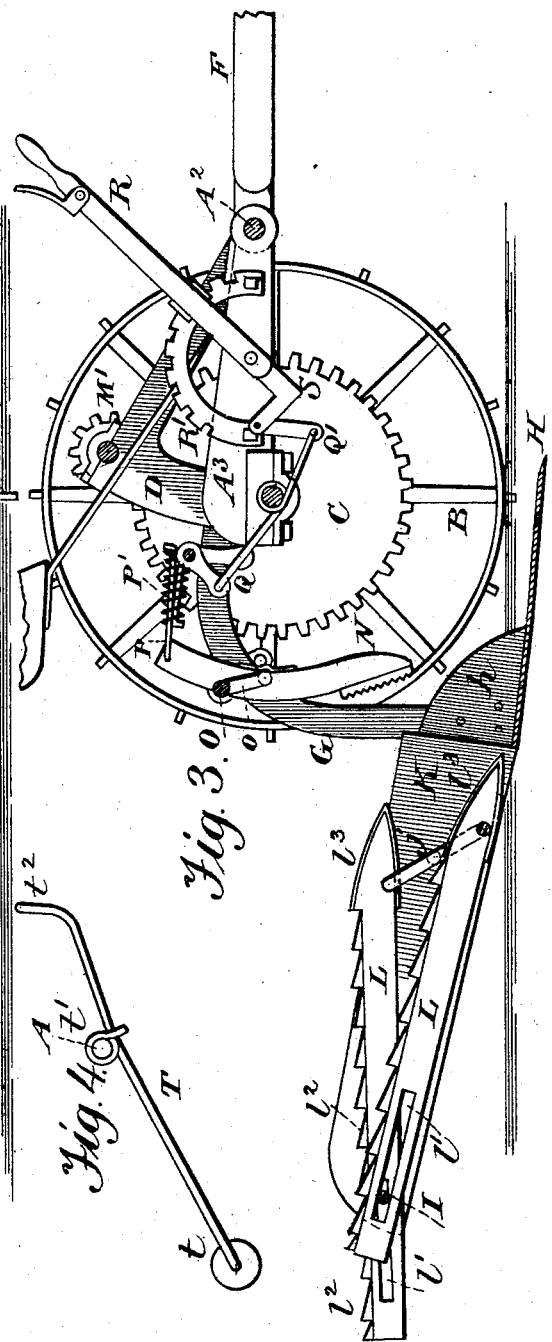
Figure 4:
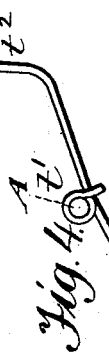
Figure 5:
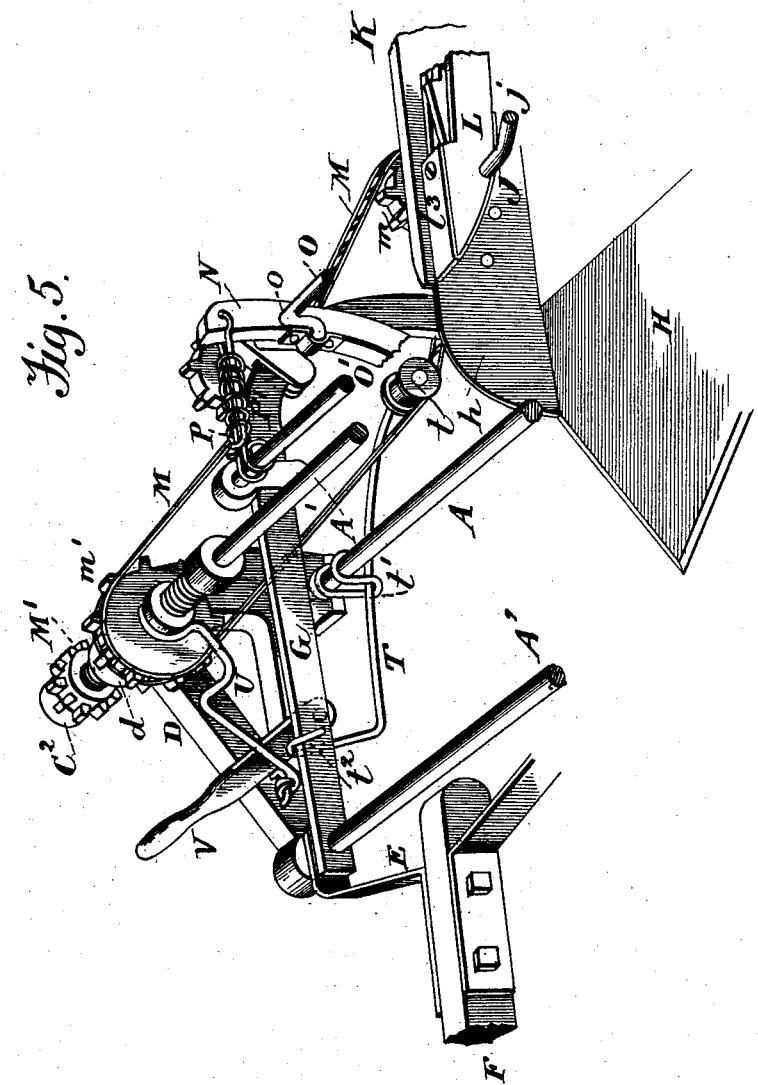

Figure 1 of the drawings is a plan view of my machine; Figs. 2 and 3, vertical longitudinal sections; Fig. 4, a detail view of the sprocket-chain tightener, and Fig. 5 a perspective detail view of the belt-tightener and mechanism for throwing in and out of gear.

In the drawings, A represents the axle, on which turn the ground-wheels B B and the large spur-wheel C, the bearings $d\ d$ being in the side pieces D D, which are preferably of an angular form, the axle A, counter-shaft A', and fixed spacing-rod $A^2$ being each placed at the vertex of one of the angles, and the two parts A $A^2$ being connected by a median bar $A^3$. To the front rod $A^2$ are pivoted the hounds E E of the tongue or pole F.

G G are two parallel rearwardly-curved bars pivoted in front to the rod $A^2$ and bolted or riveted at the rear end to the side flanges $h\ h$ of the shovel plow or lifter H. The front or cutting edge of this lifting-plow is an isosceles triangle, or nearly so, the line transversely between the rear cutting-edges being about equal to each of the sides.

K is the riddle or sieve frame, which is bolted to the rear flanges $h\ h$ of the plow and braced at the rear end by the fixed spacer-rod I. It also has near the front end a multi-crank-shaft J, on which are carried the fingers L, vertically slotted at $l$ for the passage of soil therethrough, horizontally slotted at $l'$ to slide on the rod I, and pivoted in front on the cranks $j$. On the shaft J is a sprocket-wheel $m$, and on the counter-shaft A' another $m'$, which are connected by the sprocket-chain M, so as to make the fingers L come under the lifted soil containing the potatoes as it slides back on the plow, raise it up, and throw it to the rear of the riddle. For this purpose the fingers L are provided with the shoulders $l^2$ on the upper face, while the front ends are preferably beveled underneath and provided on top with smooth faces $l^3$ of metal.

N N are rake-levers fulcrumed on cranks $o$ $o$ of the shaft O and connected at the upper end with a rod O' by the slide-links P P, pivoted at one end, turned up at the other, and held adjustably together by the spiral spring P'. These push back and separate the halm from the tubers. On the cross-rod O' is pivoted the link Q, to which is also pivoted one end of a lever R, fulcrumed on the axle A, and connected by a pivoted link Q' with the elbow-lever S, which is fulcrumed on the bar $A^3$. By unlatching the lever S from the rack-bar R' and pressing down the handle end the plow and sifter frame may be lifted above the ground in turning or going from place to place and the plow held so as to run at any preferred depth in the ground.

T is the sprocket-chain tightener, having at its bent end the grooved pulley $t$, in which the sprocket-chain is held, passing through a guide $t'$ on axle and connected by a sliding loop $t^2$ with one of the bars G.

The large spur-wheel C, carried by the ground-wheel, meshes with a loose spur-wheel $m'$ on the counter-shaft A'. The spur-wheel $m'$ is connected by a fixed clutch-collar $C^2$, with shaft A', so as to turn said shaft when it meshes with wheel C. The sprocket-wheel $m'$ has a grooved sleeve $c'$, on which fits the hook of a rod U, pivoted at $u$ to the side piece D and bent so as to leave a wedge-space between itself and the side D. In this wedge-space works a hand-bar V, which, being pressed forward, throws the mechanism out of gear with the ground-wheel axle A.

What I claim as new, and desire to protect by Letters Patent, is—

1. The combination, with the fingers L, operating as described, of the halm-racks N N, fulcrumed on crank-shaft O and connected by spring and slide-links with the rod O', for the purpose set forth.

2. The combination, with a bar G and sprocket-chain M, of a tightener T, having a bent end and on it a grooved pulley $t$, the guide $t'$, arranged on the axle, and the sliding loop $t^2$, as shown and described.

3. The link Q, pivoted on rod O', the lever R, fulcrumed on axle, the pivoted link Q', and the elbow-lever S, combined and arranged to lift the plow and sifter, as and for the purposes set forth.

4. The combination, with the loose spur-wheel $m'$ and fixed clutch-collar on the shaft A', of the hook-rod U, pivoted to the side D to leave a wedge-space between itself and said side, and the pivoted hand-bar V, working in said wedge-space, as and for the purpose set forth.

In testimony whereof I affix my signature in presence of two witnesses.

JOHN H. SAUER.

Witnesses:
GEORGE J. HEIM,
F. W. SAUER.